Patented Mar. 17, 1931

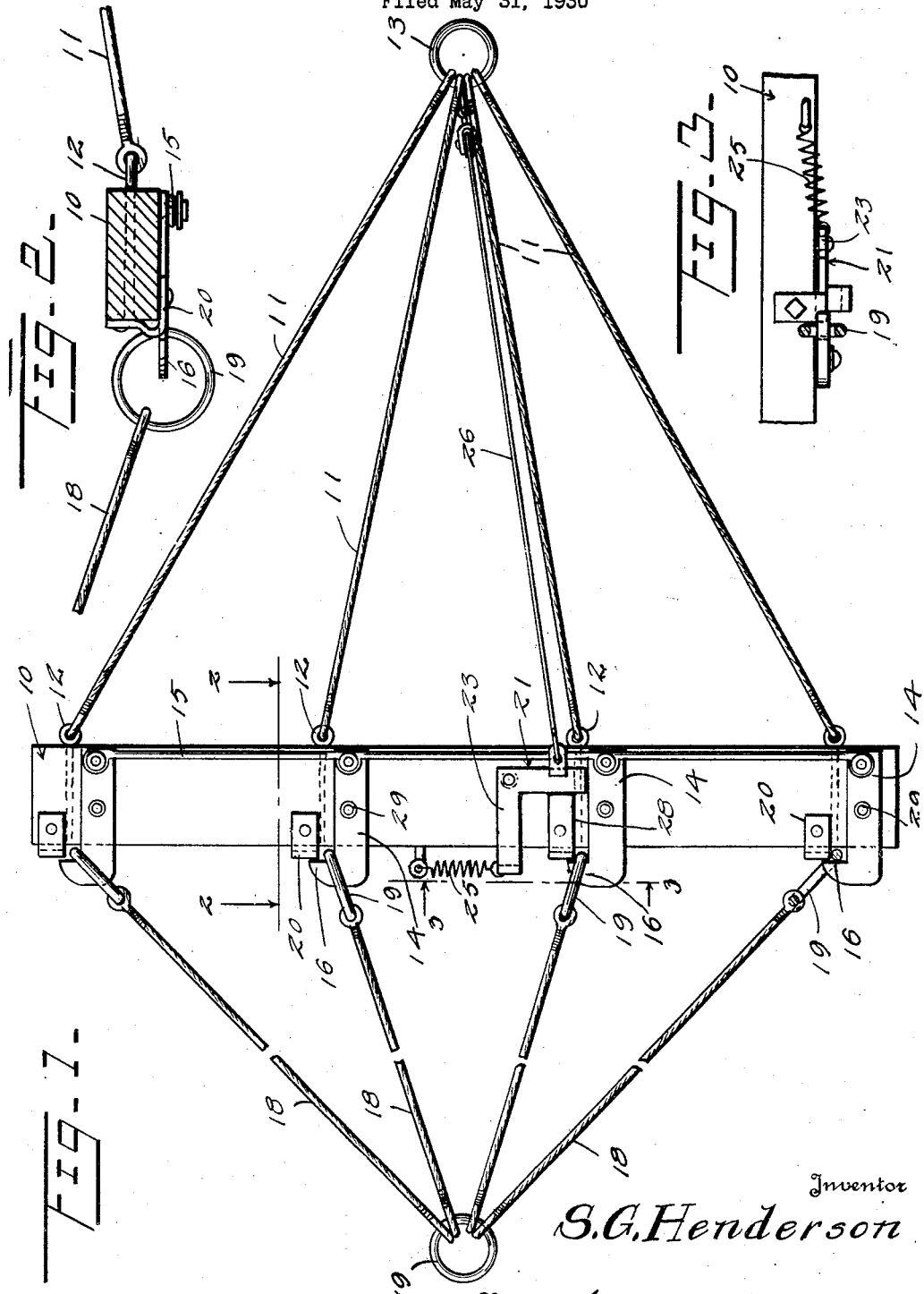

1,796,520

UNITED STATES PATENT OFFICE

SAMUEL G. HENDERSON, OF COLTON, SOUTH DAKOTA

HAY SLING

Application filed May 31, 1930. Serial No. 458,307.

The present invention relates to hay loading devices and more particularly to a hay sling.

An object of this invention is to provide a hay sling by means of which an exceedingly large quantity of hay may be hoisted to the desired point, the sling having releasable locking means for permitting the hay to drop off of the sling.

Another object of this invention is to provide an improved releasing mechanism by means of which the sling may be operated so as to permit the hay to drop at the desired point.

A further object of this invention is to provide a sling having a single cross bar or spreader which is adapted to hold the flexible portions of the sling in spaced relation to each other so as to provide a substantial net for holding the desired quantity of hay.

The above and various other objects and advantages of this invention will in part be described in and in part be understood from the following detailed description of the present preferred embodiment, the same being illustrated in the accompanying drawing wherein:—

Figure 1 is a fragmentary bottom plan view of a device constructed according to the preferred embodiment of this invention;

Figure 2 is a sectional view taken on the line 2—2 of Figure 1; and

Figure 3 is a detail fragmentary side elevation taken on the line 3—3 of Figure 1.

Referring to the drawing wherein like numerals of reference designate corresponding parts throughout the several views, the numeral 10 designates an elongated transversely disposed bar or spreader member which may be of any desired length and the numeral 11 designates a plurality of flexible members which are secured to the spreader 10 at spaced positions along one edge portion thereof, being secured to the spreader 10 by means of rings or eye bolts 12 or the like.

The flexible members 11 are adapted to converge at a point outwardly from the spreader 10 and a ring or loop member 13 is secured to the outer ends of the flexible members 11, the ring 13 being adapted to be secured to any conventional hoisting apparatus. The flexible members 11 comprise substantially one-half of a sling and provide a net by means of which the hay may be lifted or hoisted and moved to any desired point.

A plurality of rockable arms 14 are rockably mounted on the spreader 10 at spaced positions therealong and the rockable arms 14 are connected together by a longitudinally disposed connecting bar or link 15. The rockable arms 14 extend outwardly of the longitudinal edge of the spreader 10 and are provided at the outer end portion thereof with a hook 16 which is adapted to engage a ring or eye 17 carried by one end of the flexible members 18 which form the other half of the sling, the flexible members 18 converging outwardly and being secured to a ring member 19.

The spreader 10 is also provided with a plurality of outstanding lugs 20 against which the hook portions 16 are adapted to contact for securely locking the ring members 17 upon the spreader 10. A yieldably mounted locking member generally designated as 21 is pivotally mounted on the spreader 10 intermediate the ends thereof, the locking member 21 being preferably constructed in L shaped form, one leg 22 thereof being adapted to engage against one of the rockable arms 14 so as to hold the arm against rocking movement, and the other or opposite leg 23 of the locking member 21 is provided with an outstanding arm 24 in which a spring member 25 is adapted to be secured, the spring member 25 engaging at one end the outstanding arm 24 and being secured to the spreader 10 at the opposite end and being adapted to constantly urge the leg 22 against the arm 14.

A release cord 26 is secured at one end to the outstanding arm 24 and extends through a guide member or eye 27 which is mounted on the spreader 10, the opposite end of the release cord 26 being free. The release cord 26 is of sufficient length so as to permit the pulling thereof from a point remote from the sling so that the sling may be split to permit the release of the hay positioned thereupon. The movement of the locking member 21 is limted by a stop member 28 which is mounted on the spreader 10.

In the operation of this device, the sling may be spread out upon the ground or at any other point, the ring members 17 being securely locked on the hook members 16. The ring members 13 and 19 may be secured to the desired hoisting apparatus and the desired quantity of hay placed upon the sling. When the sling has been filled with the desired quantity of hay, the rings or loops 13 and 19 may be pulled upwardly and if desired may be connected to a single hook or the like, or where the quantity of hay positioned on the sling is such as to prevent the pulling of the rings 13 and 19 together, these rings may be secured to suitable flexible cords or the like which are connected to the hoisting apparatus.

When the sling has been moved to the desired point the release cord 26 may be pulled thereby rocking the releasing or locking member 21 and when the locking member 21 has been disengaged from one of the rockable arms 14 the weight of the hay or material upon the sling will force the arms 14 to rock on their pivots 29 and permit the release of the ring members 17 from the spreader 10. Due to the fact that the hook portions 16 are offset or eccentrically disposed with respect to the pivots 29 the pressure of the hay on the sling will have a tendency to force the arms 14 to rock so as to swing the hooks 16 into release position. When the release cord 26 is pulled so as to move the locking member or trigger 21 out of engagement with the abutting arm 14 the angular extension 24 will engage one edge of the spreader bar 10 thereby limiting the swinging movement of the locking member.

It will, of course, be understood that various changes and modifications may be made in the details of construction and design of the above specifically described embodiment of this invention without departing from the spirit thereof, such changes and modifications being restricted only by the scope of the following claims.

What is claimed is:—

1. A sling of the character described comprising an elongated spreader, a series of flexible members secured to said spreader in spaced relation to each other and converging outwardly therefrom, a loop member secured to the converging ends of said flexible members, a second series of flexible members, said second series of flexible members having looped inner end portions, a second ring secured to the outer converging end portions of the second series of flexible members, a plurality of rockable hook members secured to said spreader, lugs mounted on one side of the spreader and engaging the hook members when in locked position whereby to close said hook members, means for connecting said hook members together whereby to permit simultaneous rocking thereof and yieldably mounted tripping means carried by said spreader and engaging said hook members whereby to hold said hook members against rocking movement.

2. A sling of the character described comprising an elongated spreader, a series of flexible members secured to one side of said spreader and converging outwardly therefrom, a second series of converging flexible members, a plurality of rockable L-shaped securing members mounted on said spreader and adapted for simultaneous operation, a plurality of outstanding lugs mounted on one side of said spreader and engaging against said securing members when in locked position whereby to close the open end thereof, L-shaped rockable locking means mounted on said spreader and engaging against said securing members whereby to hold said securing members against rocking movement and a spring carried by the spreader and engaging one leg of said locking member whereby to constantly urge said locking member into locking position.

In testimony whereof I hereunto affix my signature.

SAMUEL G. HENDERSON.